United States Patent [19]

Hettinger, Jr. et al.

[11] Patent Number: 4,869,880
[45] Date of Patent: * Sep. 26, 1989

[54] APPARATUS FOR THE SEPARATION OF SOLID PARTICULATES FROM A GASEOUS EFFLUENT

[75] Inventors: William P. Hettinger, Jr., Russell; Steven W. Murray, Ashland, both of Ky.; Ricky L. Adkins, Huntington, W. Va.; Billy T. Fritz, Ashland, Ky.; James R. Riggs, Kenova, W. Va.; Paul W. Walters, Ashland, Ky.

[73] Assignee: Ashland Oil, Inc., Ashland, Ky.

[*] Notice: The portion of the term of this patent subsequent to Dec. 20, 2005 has been disclaimed.

[21] Appl. No.: 618,641

[22] Filed: Jun. 8, 1984

[51] Int. Cl.$^4$ ............ F27B 15/08; B01J 4/00; B01J 38/00
[52] U.S. Cl. ............ 422/147; 208/153; 208/161; 422/144; 422/145
[58] Field of Search ............ 422/144, 147, 145; 208/153, 161; 55/396, 465

[56] References Cited

U.S. PATENT DOCUMENTS

| | | | |
|---|---|---|---|
| 4,057,397 | 11/1977 | Gross et al. | 422/144 |
| 4,390,503 | 6/1983 | Walters et al. | 422/147 |
| 4,394,349 | 7/1983 | Cartmell | 422/147 |
| 4,405,444 | 9/1983 | Fandona | 208/153 X |
| 4,792,437 | 12/1988 | Hettinger, Jr. et al. | 422/147 |

Primary Examiner—Michael S. Marcus
Assistant Examiner—Amalia L. Santiago
Attorney, Agent, or Firm—Richard C. Willson, Jr.; C. William Crady; Stanley M. Welsh

[57] ABSTRACT

An apparatus for separating solids and vapors from a suspension of the two materials is disclosed. The solids are directed through a conoid element to enhance directional flow and to prevent return of solids to the separation apparatus.

4 Claims, 2 Drawing Sheets

1

APPARATUS FOR THE SEPARATION OF SOLID PARTICULATES FROM A GASEOUS EFFLUENT

BACKGROUND OF THE INVENTION

This invention relates to an apparatus for separating solid particulates from a gaseous effluent in a confined disengaging zone. More specifically, the invention is concerned with efficient separation of very small fluidized catalytic or noncatalytic particles from a gaseous effluent comprising said particles and treated carbo-metallic hydrocarbons.

In the contacting of hydrocarbons, extensive use is made of circulating fluidized systems. The apparatus employed for such systems as fluid catalytic cracking of hydrocarbon oils comprises a contacting zone, a disengaging zone, a regeneration zone and means to circulate solids, vapors and gases within the system. The apparatus of this invention centers on the disengaging zone in which fluid contacting material is rapidly separated from the gaseous effluent.

The most effective contacting zone for hydrocarbon conversion is the riser cracking zone. This device features rapid intimate contact of fluidized catalyst with hot oil vapors as the material moves up the interior of a tube. The cracked effluent is quickly separated from the catalyst particles at the top end of the tube. One effective separation apparatus features an open end riser tube in combination with a cyclone separation system; see U.S. Pat. No. 4,066,533; U.S. Pat. No. 4,070,159; and U.S. Pat. No. 4,390,503. These patents assigned to Ashland Oil Company are incorporated by reference in this disclosure. The patents disclose inter alia, a device comprising an annular chamber surrounding the upper periphery of an open ended riser conduit. One or more conduits extending laterally from the chamber pass solids and gaseous effluent to cyclone separation means.

SUMMARY OF THE INVENTION

While an open ended riser tube has many demonstrated advantages, efficiency is reduced by the tendency for a portion of the separated solids in the disengaging zone to be deflected back into the area proximate the end of the riser tube. The cone device developed by the present inventors provides an improved and more efficient apparatus.

DESCRIPTION OF THE PREFERRED EMBODIMENT

Figure 1:
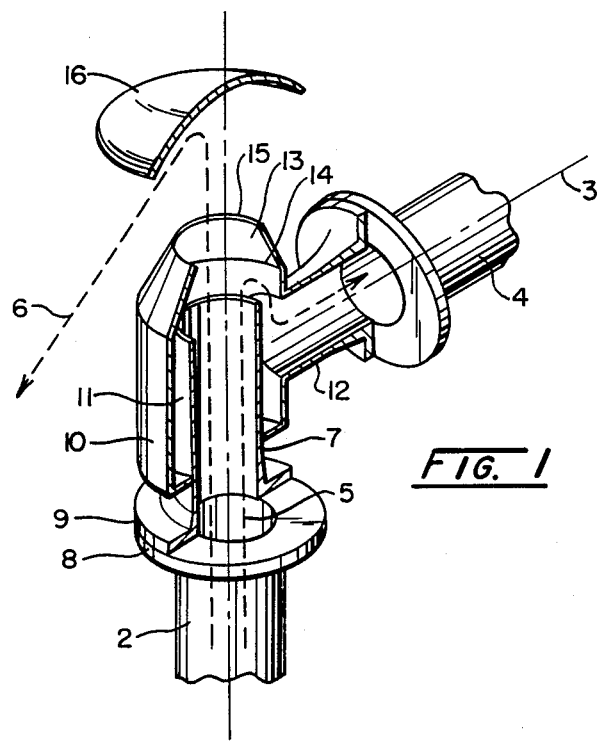
FIG. 1 is a vertical partial cross-sectional view of one-embodiment of the apparatus of the invention.

The apparatus of this invention is most effective in situations where fluidized particles most be separated as rapidly as possible from treated effluent. In one preferred embodiment fluid cracking catalyst is separated from effluent vapor. In another embodiment, another essentially inert solid fluidized contact material is separated from vaporized carbo-metallic oil after the material has absorbed metals and carbon from the oil vapors. Suitable inert materials include clays, coke particles, spent cracking catalyst, etc.

The present commercial riser cracking unit comprises a tubular riser which terminates in a disengaging zone, means for separating catalyst and effluent in said zone, a catalyst regenerator and means for moving a large inventory of hot fluid catalyst particles around the unit. The fluid cracking catalyst used in the cracking unit may be of the conventional type such as activated clay, silicia alumina, silica zirconia, etc., but natural and synthetic zeolite type catalysts comprising molecular sieves in a matrix having an average particle size ranging from about 40 to about 100 microns are preferred. The feedstock converted in the unit may be a hydrocarbon oil which yields transportation fuels after cracking. The preferred feedstock may be desalted whole petroleum crude oil, topped petroleum crude oil, heavy oil fractions from petroleum refining steps such as hydrodesulfurization, solvent deasphalting, visbreaking, vacuum distillation and demetallation treatments. Heavy oil feeds have an initial boiling point above about 288° C. (550° F.) and they contain from about 1 to 100 ppm of organo-metallic compounds. In addition, such heavy oils contain from 0.1 to 20 volume percent asphaltenes and they have a Conradson Carbon content in the range of 3 to 10 weight percent and an A.P.I. gravity of 15 to 25 degrees. The preheated feed enters the reaction zone (riser cracking zone) of the cracking unit where it is vaporized and intimately mixed with hot molecular sieve-type catalyst. The reaction mixture passes rapidly up the riser and the oil feed cracks to lighter hydrocarbons boiling in the motor fuel range in a few seconds or less. When the riser disclosed herein and in U.S. Pat. No. 4,070,159 is employed, virtually all the catalyst is disengaged from the reaction product vapors by ballistic separation. The majority of the catalyst, e.g. 8–90 vol. %, passes in a vertical path upward into the zone while a minor portion of the catalyst passes laterally in a generally horizontal plane into the cyclone system with the cracked effluent. Spent catalyst is recovered in the lower section of the disengaging zone from which it is transported to the regeneration zone. Cracked effluent is passed to a product recovery zone.

The upper section of the disengaging zone usually has a dome-like configuration typical of pressure vessels. Within the section, a plurality of cyclone separators are mounted in spaced relationship to one another. The cyclones, together with the structural hardware used to mount them and hold them firmly in place, provides many surfaces which cause many of the catalyst particles to turn and move on a path back into the top of the vented riser.

The present inventors have found that a truncated inverted cone (nozzle) atop the cup portion of the vented riser acts as a shield to prevent particles from being deflected into the cup. In addition, the cone provides a nozzle effect resulting in a better trajectory for particles leaving the separation zone.

EXAMPLE 1

(ACCORDING TO THE INVENTION)

The invention will be described further with reference to the drawings. Referring to FIG. 1, an embodiment is presented as a partially cutaway along the centerline 1 of the riser 2 and the centerline 3 of the outlet 4 to the cyclone(s) (not shown). The path of the cracked effluent product as it progresses through the separation and recovery phase is depicted by dotted lines. The path of the solid particulate material as it progresses through the separation and recovery phase is depicted by a dotted line 6. In the particular embodiment shown, riser 2 terminates with an extension 7 mated to the riser with flanges 8 and 9. The riser extension is encircled by shroud 10 which is closed at the bottom and open at the top, thereby forming an annular collection zone 11 which surrounds the end of the riser. A transverse conduit 12 connects the collection zone with the outlet 4 to the cyclones (not shown).

The shroud 10 is capped with a truncated geometric cone 13. The bottom plane of the cone 14 coincides with the top plane of the shroud and these have the same diameter. The top plane of the cone represented by reference numeral 15 is of a smaller diameter as will be discussed with reference to FIG. 2. In this embodiment, a deflector disc 16 is located above the top of cone 13. The deflector disc may be eliminated, if it is desired, to rely on the dome shape of the disengaging zone for deflection of the solid particles.

The suspension of catalyst and vapor exiting riser 2 of FIG. 1 will be flowing at a rate of at least about 25 to 35 feet per second and the catalyst loading in the riser will be in the range of 0.3 to 2.0 pounds per cubic foot. At the top of the riser, the solids, having the greater momentum, continue to flow in the established direction or path while the vapors, having lesser momentum, are caused to make an abrupt change of direction. The product vapors are also under the effect of a negative pressure differential from the interior of the riser 2 and/or the extension 7 to the interior of the outlet 4 to the cyclones (not shown). Accordingly, due to the momentum differential and the negative pressure differential, an abrupt separation is achieved. While the separation of solids and product vapors is very effective, it is not complete. From about 90 to about 99.5 wt. % of the solids and from about 1.0 to about 0.0001 wt. % of the product vapors pass into the disengagement chamber. Product vapors in the chamber must reenter the riser and are collected via cyclones and solids are collected from the chamber for regeneration and recycle. It is important that steps be taken to prevent solids in the disengagement chamber from returning to the locus of the exit end of the riser and the shroud because separation efficiency is affected by solids flowing opposite to the desired direction. A cone atop the open cup shroud acts as a shield to prevent solid particles from being deflected into the cup. It has been found that rather than constricting and interfering with flow from the riser and open cup, separation efficiency is improved and over conversion of hydrocarbon vapors is avoided.

Figure 2:
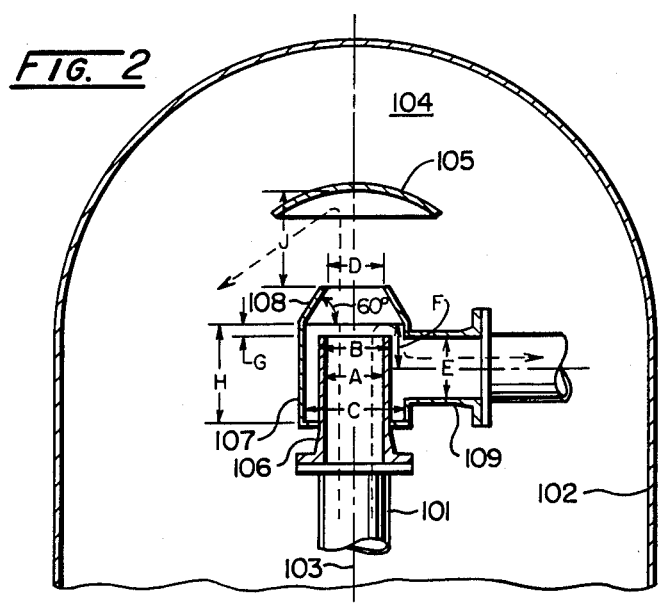
FIG. 2 is a vertical partial cross-sectional view of one embodiment of the apparatus of the invention, including certain size relationships.
Figure 3:
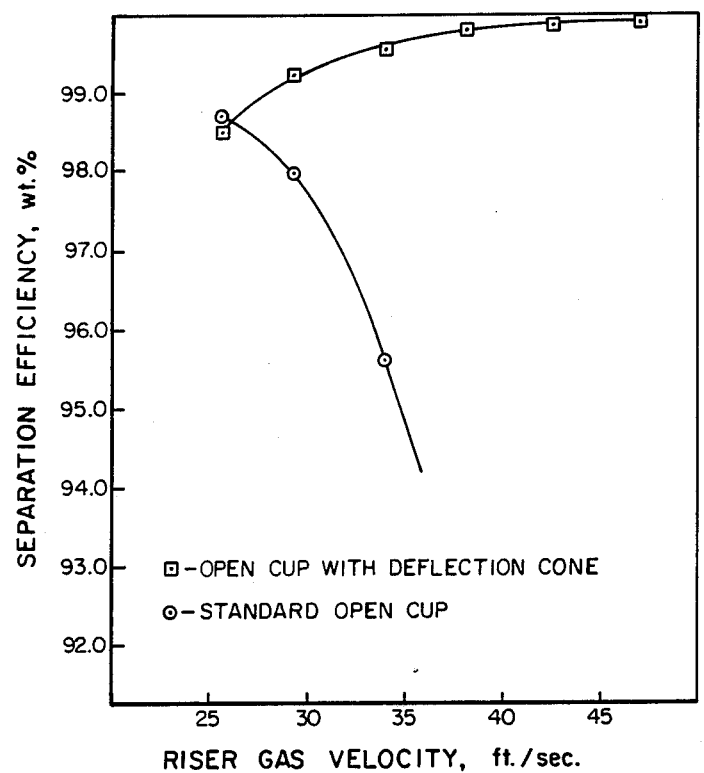
FIG. 3 is a graphical showing of comparative data.

FIG. 2 depicts a preferred configuration of the separation apparatus of the invention. Referring to FIG. 2, the riser 101 is centrally positioned within the disengagement chamber 102 along vertical centerline 103. The diameter of the riser relative to a cylindrical chamber will be in the range of 1 to 5 and 1 to 30. The chamber preferably has a dome shaped top shown generally by reference numeral 104. It will be understood by those skilled in the art that the internal part of the chamber proximate the dome will be occupied by cyclones, a plenum and sufficient structural elements to mount the same. These devices and elements contribute to the problem of deflection of solids into the end of the riser and into the shroud.

Deflector disc 105 provides an effective means of turning the path of the solids from vertical to a downward path remote from the riser discharge. The disc can be mounted in the dome by any suitable means (not shown).

EXAMPLE 2

(ACCORDING TO THE INVENTION)

In a preferred embodiment a shroud assembly comprising a riser extension element 106, an annular shroud element 107, a cone element 108 and a lateral extension element 109 are assembled as a unit. The unit can be welded and/or bolted to join the elements together. Suitable materials include carbon steel and stainless steels which may be lined with antiwear materials like Refractory and Hexmesh.

The cone element has a circular base, a circular top edge parallel to the base and slanted side to provide a constriction used to direct the flow of solids and associated vapor effluent. The cone acts like a nozzle that tapers to direct the flow of the fluid and in the most preferred embodiment the flow is directed toward a convex deflector disc located at a suitable position above the top of the cone. Typical and preferred size relationships of the separation apparatus of the invention are shown in Table 1.

TABLE 1

| FIG. 2 Reference | Size or Relationship | Size or Spacing Range (inches) | Preferred Size or Spacing Range (inches) |
|---|---|---|---|
| A | Riser inside diameter | 4–100 | 12–72 |
| B | Riser outside diameter within separator cup | 4.5–130 | 14–82 |
| C | Shroud inside diameter | 5–160 | 16–108 |
| D | Cone opening | 3–120 | 10–78 |
| E | Lateral outlet inside diameter (preferably equal to A) | 4–100 | 12–72 |
| F | Lateral outlet radius | 2–50 | 6–36 |
| G | Riser top lip to cone base | (−2)–20 | (−2)–12 |
| H | Shroud length | 6–170 | 18–130 |
| J | Top of cone to max cord of disc | 4–250 | 12–200 |

The concept of the invention was evaluated in a testing unit. The experimental apparatus used to test this concept is a clear plastic model of a cracking unit consisting of a riser, disengager/stripper, two stage regenerator and connecting standpipes. The model is operated at room temperature under vacuum. Room air enters the unit at the bottom of the riser and base of the regenerator through regulating valves and is discharged from the disengager and regenerator respectively, is metered, and exits through a vacuum pump. Air can also enter the unit in other locations such as the stripper if necessary. The riser diameter of this unit is ½ inch with the other dimensions scaled appropriately.

A test is conducted by passing a specific amount of fluidized solid up the riser over a specific time and with a specific riser gas velocity. Solids loss from the disengager is recovered in an external cyclone with a sealed dipleg. Separation efficiency is determined as:

$$100\% \left(1 - \frac{\text{Loss}}{\text{Load}}\right) = \% \text{ Efficiency}$$

Where:

Loss=solids collected in the external cyclone dipleg.

Load=amount of catalyst passed up the riser.

Table 2 shows test results at increasing riser velocity with and without a cone atop the shroud (cup).

TABLE 2

| Velocity (ft/sec) | Std. Open Cup (wt. % Efficiency) | Cup with Cone (wt. % Efficiency) |
| --- | --- | --- |
| 29.6 | 97.8 | 99.2 |
| 34.2 | 95.5 | 99.5 |
| 38.4 | (—) | 99.8 |
| 42.8 | (—) | 99.8 |
| 47.4 | (—) | 99.9 |

Figure three based on the data of Table 2 shows that as riser gas velocity increases the cone improves separation efficiency over the efficiency of the standard open cup.

The foregoing description and data demonstrates that the cone device atop the shroud improves separation efficiency by orienting the flow of solids out of the separation unit and simultaneously acts as a shield to prevent particles from being deflected into the cup.

Modifications and variations of the invention as set forth herein may be made without departing from the scope thereof and the invention is limited only by the appended claims. For example, the cone can have curved sides rather than straight as shown in FIG. 1, so long as the curved side functions as an efficient nozzle.

What is claimed is:

1. Apparatus for the separation of hot fluid cracking catalyst suspended in vaporized riser cracker effluent boiling in the motor fuel range consisting of the combination of
   A. A disengaging chamber having a dome shaped top section:
   B. A vertical tubular cracking riser open at the upper end and positioned on the center axis of said chamber;
   C. An annular shroud encircling the upper end of said riser, the bottom of said shroud being closed to form an annular collection chamber;
   D. A plurality of cyclone separators in open lateral communication with said shroud via transverse conduit and adapted to receive and separate the converted hydrocarbon vapors from fluid cracking catalyst;
   E. a truncated cone mounted atop and integral with said shroud, the diameter of the top planar surface of said cone being essentially the same as the inside diameter of said riser, said cone functioning to prevent reentry of solids into said shroud and said cyclones, and
   F. A downwardly convex baffle member spaced above the top of said cone a distance of about two diameters of said riser.

2. Apparatus for separating converted hydrocarbon products vapors from fluid cracking catalyst consisting essentially of the combination of:
   A. A disengaging chamber having a dome shaped top;
   B. An elongated round riser pipe having an open end adapted to deliver a major portion of the catalyst axially into the top part of said chamber;
   C. An annular shroud surrounding the upper end of said pipe defining an annular separation chamber, the upper section of the shroud comprising a short hollow cone, said cone functioning to enhance the flow of solids into the chamber and to prevent reentry of solids into the shroud area; and
   D. A plurality of cyclone separators in open lateral communication with said shroud below said cone and adapted to receive and separate the converted hydrocarbon vapors from fluid cracking catalyst.

3. Apparatus according to claim 2 in which the distance G from the top edge of the riser to the bottom of the cone is 0 to 12 inches.

4. Apparatus according to claim 2 in which said annular shroud is closed at the bottom to provide an annular cup-like collection zone.

* * * * *